US012297682B1

(12) United States Patent
McMahan

(10) Patent No.: US 12,297,682 B1
(45) Date of Patent: May 13, 2025

(54) UTILITY GATE HARDWARE DEVICES AND METHODS

(71) Applicant: William Talton McMahan, Pleasant View, TN (US)

(72) Inventor: William Talton McMahan, Pleasant View, TN (US)

( * ) Notice: Subject to any disclaimer, the term of this patent is extended or adjusted under 35 U.S.C. 154(b) by 0 days.

(21) Appl. No.: 17/740,218

(22) Filed: May 9, 2022

Related U.S. Application Data

(60) Provisional application No. 63/258,495, filed on May 10, 2021.

(51) Int. Cl.

| | |
|---|---|
| ***E06B 11/04*** | (2006.01) |
| ***E05D 3/02*** | (2006.01) |
| ***E05D 7/00*** | (2006.01) |
| ***E05D 15/04*** | (2006.01) |

(52) U.S. Cl.
CPC ................. *E05D 7/00* (2013.01); *E05D 3/02* (2013.01); *E05D 15/04* (2013.01); *E06B 11/04* (2013.01); *E05Y 2900/40* (2013.01)

(58) Field of Classification Search
CPC ........... E06B 11/021–04; E06B 11/022; E06B 11/00; E05D 3/00; E05D 7/1044; E05D 7/00; E05D 11/04; E05D 2005/122; E05D 2005/124; E05D 5/121; E05D 5/128; E05Y 2900/40
See application file for complete search history.

(56) References Cited

U.S. PATENT DOCUMENTS

| | | | | | |
|---|---|---|---|---|---|
| 639,800 | A * | 12/1899 | Wood | E06B 11/02 160/156 |
| 760,782 | A * | 5/1904 | Dysart | E06B 11/02 160/156 |
| 1,032,776 | A * | 7/1912 | Russell | E05D 7/04 16/313 |
| 1,837,204 | A * | 12/1931 | Chester | E05D 11/1007 16/343 |
| 3,107,390 | A * | 10/1963 | Shelton | E06B 11/04 248/219.3 |
| 3,295,158 | A * | 1/1967 | Hotchkiss, Jr. | E06B 11/04 403/164 |

(Continued)

FOREIGN PATENT DOCUMENTS

| | | | |
|---|---|---|---|
| AU | 2003207029 | A1 * | 1/2004 |
| AU | 2012100483 | A4 | 5/2012 |

(Continued)

*Primary Examiner* — Daniel P Cahn
*Assistant Examiner* — Patrick B. Ponciano
(74) *Attorney, Agent, or Firm* — Holland & Knight LLP; Matthew C. Cox

(57) ABSTRACT

A gate apparatus includes a structure such as a post and a gate hinge bolt disposed on the structure. The gate hinge bolt includes a threaded shaft inserted into the structure and a mounting boss extending perpendicularly from the threaded shaft, wherein the mounting boss is spaced away from the structure by a mounting boss distance. A gate having a gate hinge barrel is positioned on the mounting boss, and an exposed portion of the mounting boss protrudes from the gate hinge barrel. An anti-rotation bracket is disposed between the structure and the exposed portion of the mounting boss to prevent rotation of the gate hinge bolt relative to the structure when the gate is opened or closed.

19 Claims, 17 Drawing Sheets

(56) References Cited

U.S. PATENT DOCUMENTS

| | | | | | |
|---|---|---|---|---|---|
| 3,908,311 | A * | 9/1975 | Romberg | E06B 11/021<br>292/247 |
| D297,912 | S * | 10/1988 | Richards | D8/387 |
| 4,793,098 | A * | 12/1988 | Wilkerson | E05B 53/003<br>49/501 |
| 5,358,292 | A * | 10/1994 | Van Wiebe | E05C 3/30<br>292/225 |
| 5,716,041 | A * | 2/1998 | Groves | E06B 11/02<br>49/55 |
| 6,073,396 | A * | 6/2000 | Kietzmann | E06B 11/04<br>16/237 |
| 8,800,110 | B1 * | 8/2014 | Stephenson | E05D 7/0423<br>16/245 |
| 10,329,803 | B1 * | 6/2019 | Lieser | E05C 3/06 |
| 2020/0011104 | A1 * | 1/2020 | Davis | E05D 3/02 |
| 2021/0140464 | A1 * | 5/2021 | Law | E05D 5/10 |
| 2022/0381074 | A1 * | 12/2022 | Davis | E05D 5/10 |

FOREIGN PATENT DOCUMENTS

| | | | | |
|---|---|---|---|---|
| GB | 2193249 | A * | 2/1988 | E05D 5/02 |
| NZ | 212354 | A * | 6/1985 | |

* cited by examiner

UTILITY GATE HARDWARE DEVICES AND METHODS

CROSS-REFERENCE TO RELATED APPLICATION

This application is a non-provisional of, and claims benefit of and priority to, U.S. Provisional Patent Application No. 63/258,495 filed May 10, 2021, all of which is hereby incorporated by reference in its entirety.

TECHNICAL FIELD

The present invention relates generally to utility gates and hardware for mounting utility gates, and more particularly to devices and methods for securing a utility gate to a post.

BACKGROUND

Conventional utility gates such as those used on farms and in agricultural applications typically include a gate pivotally mounted to a fence post or upright stanchion. The gate may be configured to be opened and closed by a user by rotating the gate relative to the post. When such gates are in the open position, livestock, people or vehicles may pass through the gate opening, and when such gates are in a closed position the gate blocks the gate opening to prevent passage.

Utility gates may be mounted to a fence post or upright stanchion using gate hardware. When mounting a gate, such as an agricultural gate, to a fence post, it is customary to utilize various forms of hinge bolts, commonly referred to as dog bolts or gudgeon bolts, which provide a means for the gate to rotate about the fence post. These gate hinge bolts are commonly threaded, pass through the fence post, are adjustable and secured by combinations of washers and nuts. Alternatively, these bolts may also take the form of a lag bolt that is screwed into the fence post via a blind hole or through hole in the post.

Regardless of the method of attachment of the gate hinge bolt to the fence post, most commonly used gate hinge bolts have basic features such as threads, a surface for the gate hinge to rotate and rest on and a boss, trunnion or pintle for the gate to rotate about. One of the faults in gate hinge bolts commonly in use is that they tend to rotate about the threaded axis of the bolt when the gate that is attached to them is opened. This tendency to rotate is caused by the torsional loading the gate applies to each gate hinge bolt. This torsional loading reaches its maximum when the gate is opened ninety degrees to the line of the fence. In this position, gravity induces a moment arm on the gate causing the gate to sag and potentially drag on the ground thus making the gate more difficult to open and close.

In many applications, conventional utility gates and associated gate hardware suffer from a problem of the gate falling off the mount. For example, when a gate is opened, the upper or lower mounting hardware, or both, may rotate relative to the post. Such rotation causes the gate to fall off the mount. A user must then rehang the gate or secure the gate to the fence row to close the gate until the gate can be properly remounted.

What is needed, then, are improvements in utility gates and gate hardware for mounting utility gates to posts.

BRIEF SUMMARY

The present disclosure, which comprises multiple embodiments, includes a mechanism by which a gate hinge bolt can be prevented from rotating about its threaded axis when installed in a structure such as but not limited to a square or round fence post, a wall, or a structural member including a side or corner of a building, and placed under torsional load by incorporating features into the gate hinge bolt itself or by incorporating multiple additional hardware components that interface with the gate hinge bolt to prevent rotation.

The present disclosure relates to an anti-rotation bracket configured for use with a gate hinge bolt and a gate to prevent rotation of the gate hinge bolt during use. The bracket includes numerous embodiments including a structure that extends from the post engaging a portion of the gate hinge bolt to prevent the gate hinge bolt from inadvertently rotating relative to the post during use.

The present disclosure further provides gate hinge hardware including a gate hinge bolt configured for attachment to a post and an anti-rotation bracket also configured for attachment to the post above or below the gate hinge bolt. The bracket engages a portion of the gate hinge bolt to prevent rotation of the gate hinge bolt relative to the post during use.

The present disclosure further provides a gate apparatus including an upright post or wall, a gate, at least one gate hinge bolt including a threaded portion and a mounting boss extending from the gate hinge bolt, and an anti-rotation bracket disposed between the post and the mounting boss configured to prevent the gate hinge bolt from rotating relative to the post during use.

Numerous other embodiments of the claimed invention are encompassed within the scope of the present disclosure.

DETAILED DESCRIPTION

Figure 1:
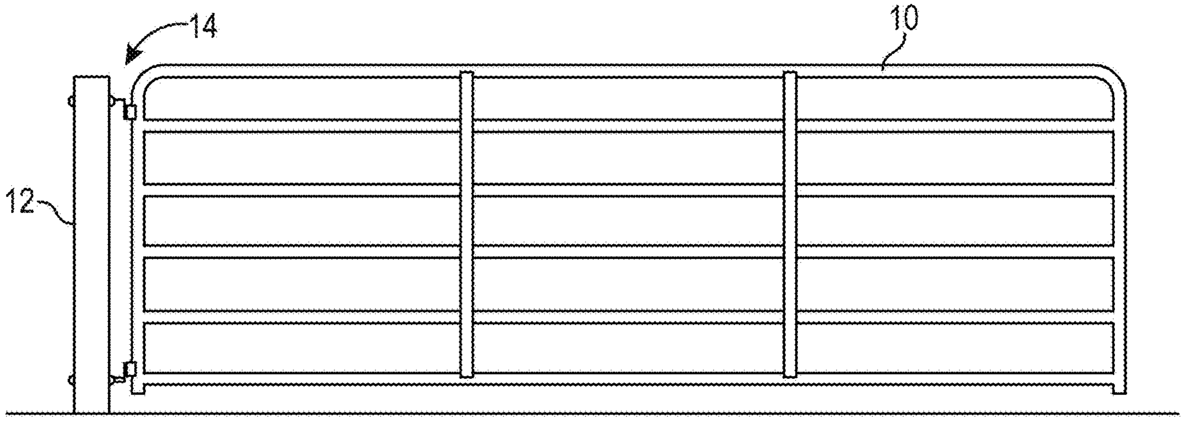
FIG. 1 (Prior Art)
FIG. 1 is an elevation view of an embodiment of a prior art gate mounted to a post with gate hardware.

Referring now the drawings, FIG. 1. illustrates a prior art embodiment of a gate apparatus including a gate 10, a structure such as a post 12 and a gate hinge 14. Gate hinge 14 includes a gate hinge bolt 16, shown in various embodiments in FIG. 2 and FIG. 3. In some conventional embodiments, a gate hinge bolt 16 includes a threaded body 18 and a mounting boss 20 oriented about ninety degrees from the threaded body 18. Threaded body 18 includes a threaded rod configured to insert through a horizontal hole in post 12. Gate hinge bolt 16 includes a shoulder 22 between mounting boss 20 and threaded body 18 in some embodiments. Shoulder 22 provides an axial stop against which a socket on gate 10 may rest. Although the disclosure may refer to a post, it is understood within the scope of the invention that post 12 may include any structure for mounting a gate such as but not limited to a square or round fence post, a wall, or a structural member including a side or corner of a building.

Figure 2:
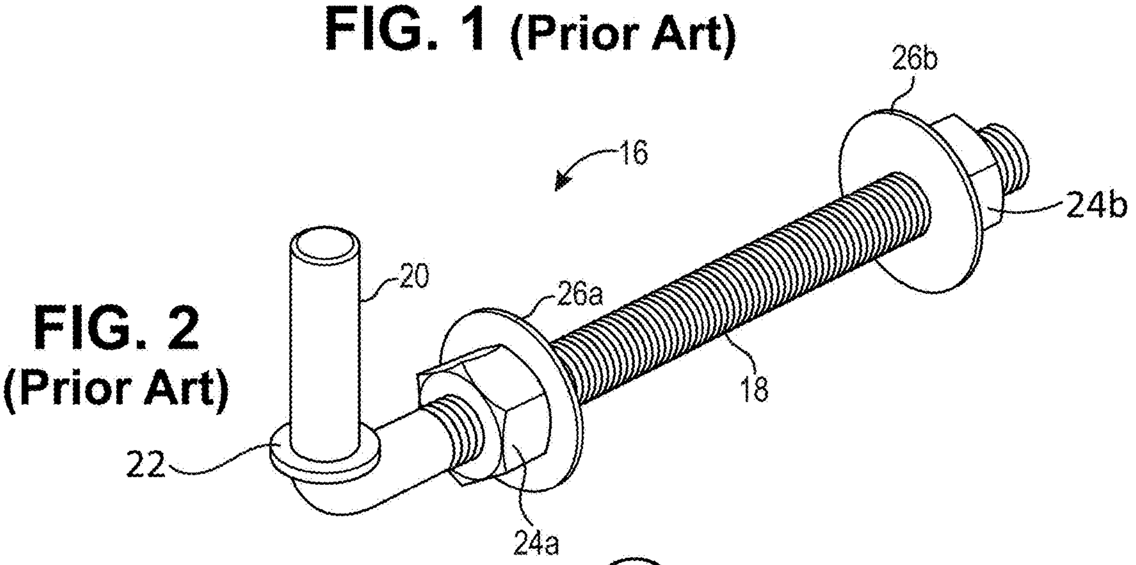
FIG. 2 (Prior Art)
FIG. 2. is a perspective view of a prior art though bolt for mounting a gate to a post.
Figure 4:
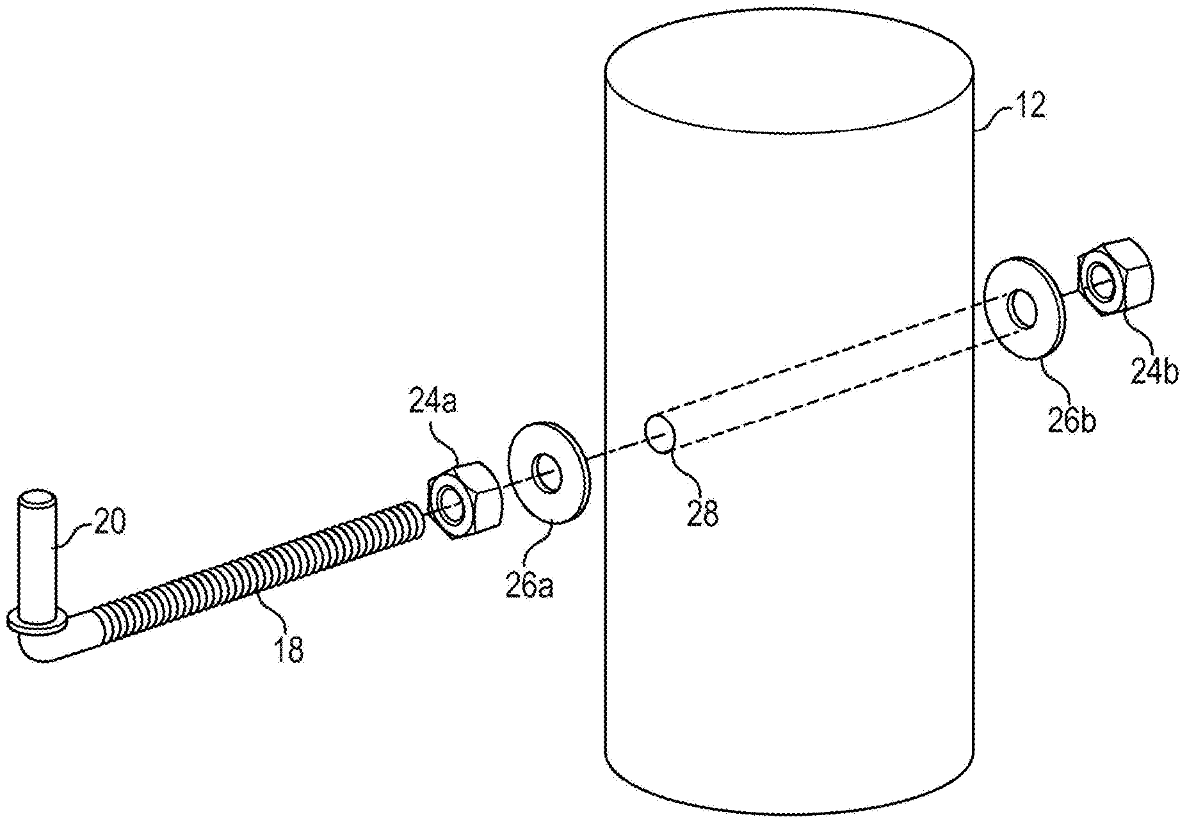
FIG. 4 (Prior Art)
FIG. 4 is a perspective view of a prior art through bolt positioned for installation on a post.

Referring further to FIG. 2, in some embodiments, gate hinge bolt 16 includes a first fastener 24*a* and a second fastener 24*b*. First and second fasteners 24*a*, 24*b* may be tightened against post 12 on opposite sides of the post to tighten the gate hinge bolt 16 relative to the post. A first washer 26*a* is positioned adjacent first fastener 24*a*, and a second washer 26*b* is positioned against second fastener 24*b* in some embodiments, also shown in FIG. 4.

Figure 3:
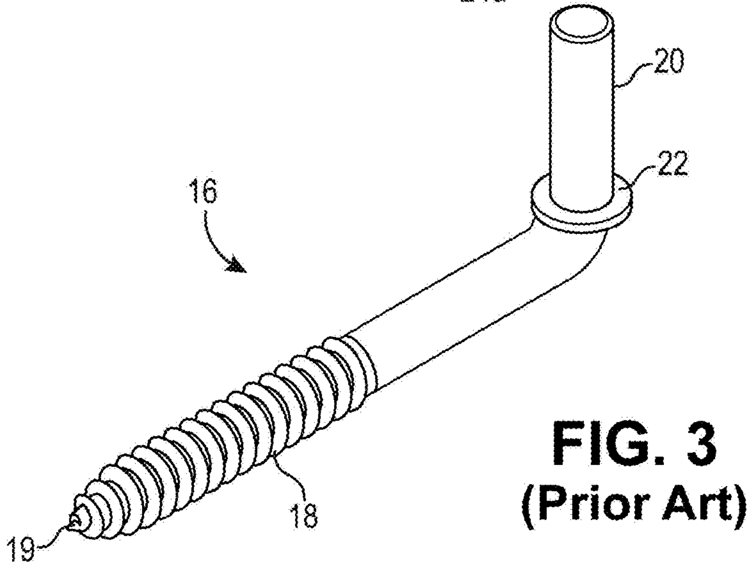
FIG. 3 (Prior Art)
FIG. 3 is a perspective view of a prior art lag bolt for mounting a gate to a post.

Referring further to FIG. 3, in some embodiments conventional gate hinge bolts include a lag screw configuration with a threaded body 18 and a pointed tip 19 such that gate hinge bolt 16 may be screwed directly into the post 12.

Figure 5:
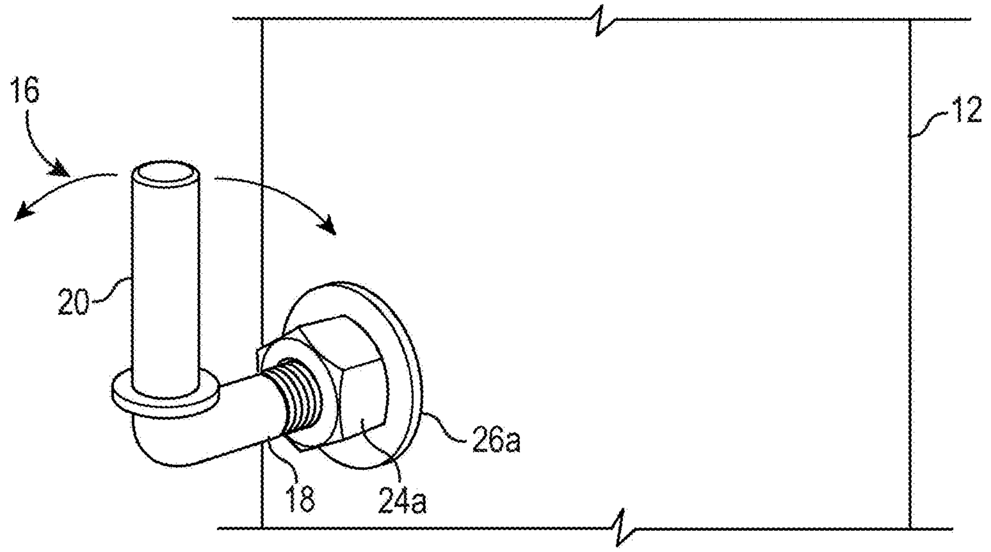
FIG. 5 (Prior Art)
FIG. 5 is a detail perspective view of the through bolt of FIG. 4 installed on a post.

Referring to FIG. 5, during use, conventional gate hinge bolt 16 may loosen and inadvertently rotate relative to post 12. More specifically, threaded rod 18 may rotate relative to post 12 causing mounting boss 20 to pivot about the longitudinal axis of the threaded rod 18. Such rotation may cause the gate to fall off the mounting hardware and drop onto the ground. Over time, it may not be possible to secure the gate hinge bolt 16 back into proper alignment relative to post 12 due to excess wear between the mounting hardware and the post.

Figure 6:
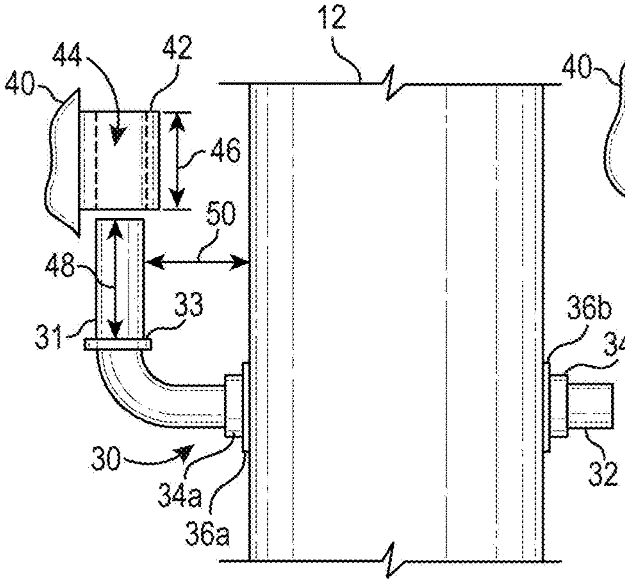
FIG. 6 is a side view of an embodiment of a gate hinge bolt installed on a post positioned to receive a gate.

Referring to FIG. 6, a gate hinge bolt 30 in accordance with the present disclosure includes a shaft 32 extending into post 12. In some embodiments, shaft 32 extends partially through post 12, and in other embodiments shaft 32 extends completely through post 12 and protrudes from the opposite side. A first fastener 34*a* is disposed on shaft 32 on the hinge side of post 12, and a second fastener 34*b* is disposed on shaft 32 on the opposite side of post 12. In some embodiments a first washer 36*a* is disposed between first fastener 34*a* and post 12, and a second washer 36*b* is disposed between second fastener 34*b* and post 12.

A mounting boss 31, trunnion or pintle, protrudes from the longitudinal axis of gate hinge bolt 30 oriented about ninety degrees relative to the longitudinal axis of shaft 32. Mounting boss 31 includes a smooth cylinder with a mounting boss height 48 in some embodiments. A shoulder 33 is disposed on the lower end of mounting boss 31. Shoulder 33 includes a radius larger than the radius of mounting boss 31 such that a gate hinge barrel or socket 42 on gate 40 rests against shoulder 33 during use. Gate hinge barrel 42 includes a bore 44 shaped to receive mounting boss 31, as shown in FIG. 7.

Figure 7:
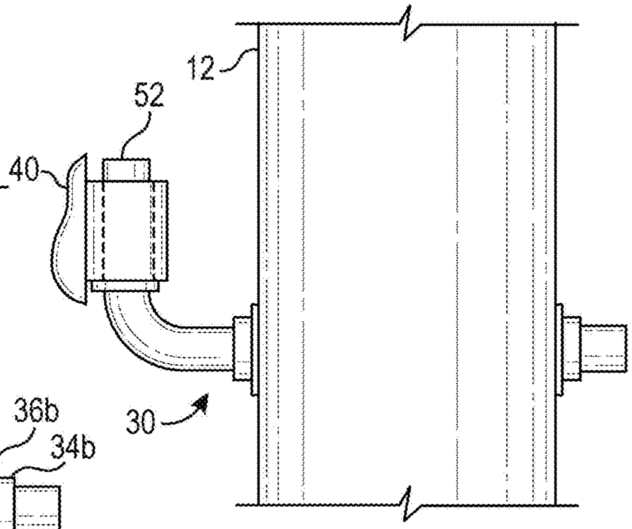
FIG. 7 is a side view of the embodiment of a gate hinge bolt installed on a post with the gate installed.

As shown in FIG. 6 and FIG. 7, in some applications an exposed portion 52 of mounting boss 31 extends above gate hinge barrel 42 when mounting boss 31 is received in bore 44. Mounting boss 31 includes a mounting boss height 48 including the portion of mounting boss 31 extending above shoulder 33. Similarly, gate hinge barrel 42 includes a barrel height 46 less than mounting boss height 48, shown in FIG. 6. When gate hinge barrel 42 on gate 40 is positioned on mounting boss 31, an exposed portion 52 of mounting boss 31 protrudes above gate hinge barrel 42. In additional embodiments, such as on a top mount on a gate, gate hinge bolt 30 may be turned down such that mounting boss 31 extends down toward the ground, and the exposed portion 52 protrudes below gate hinge barrel 42.

Figure 8:
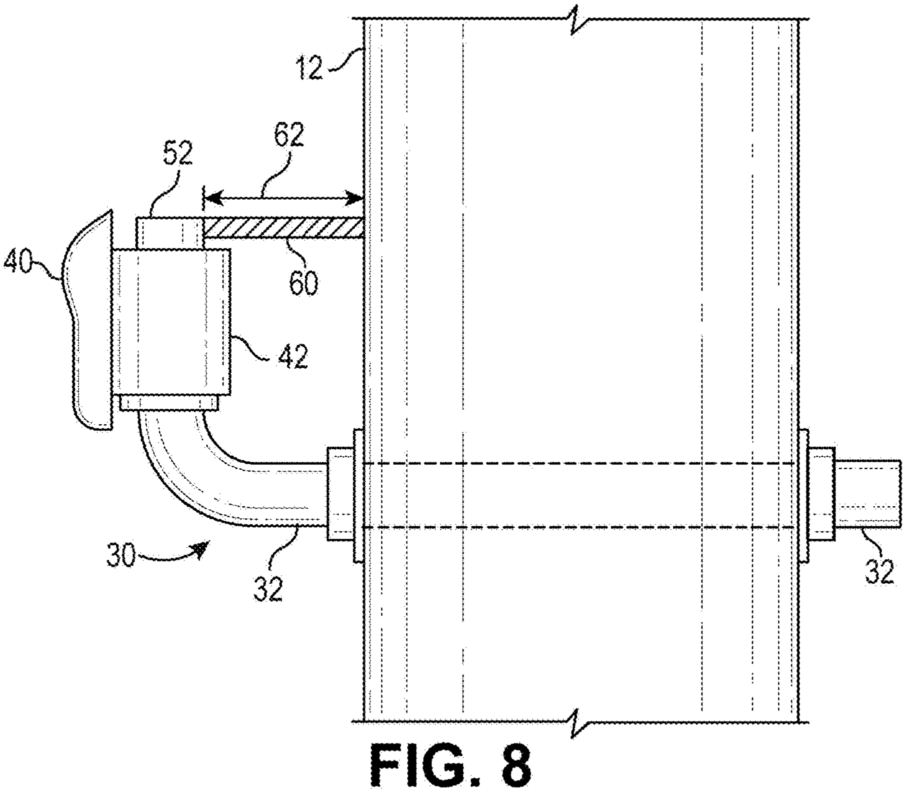
FIG. 8 is a side view of an embodiment of a gate installed on a gate hinge bolt with an anti-rotation bracket installed between the gate hinge bolt and the post.

Referring to FIG. 8, the present disclosure provides an anti-rotation bracket 60 disposed between post 12 and gate hinge bolt 30 to prevent rotation of gate hinge bolt 30 relative to post 12. More specifically, bracket 60 extends between post 12 and exposed portion 52 of mounting boss 31 protruding above gate hinge barrel 42. Bracket 60 is secured to post 12 on one end and mechanically engages exposed portion 52 of mounting boss 31 at the other end. When a moment arm is applied to gate hinge barrel 42 causing gate hinge barrel 42 to begin a rotation relative to post 12, bracket 60 mechanically interferes with mounting boss 31 and prevents rotation of the gate hinge bolt 30 relative to post 12.

Figure 9:
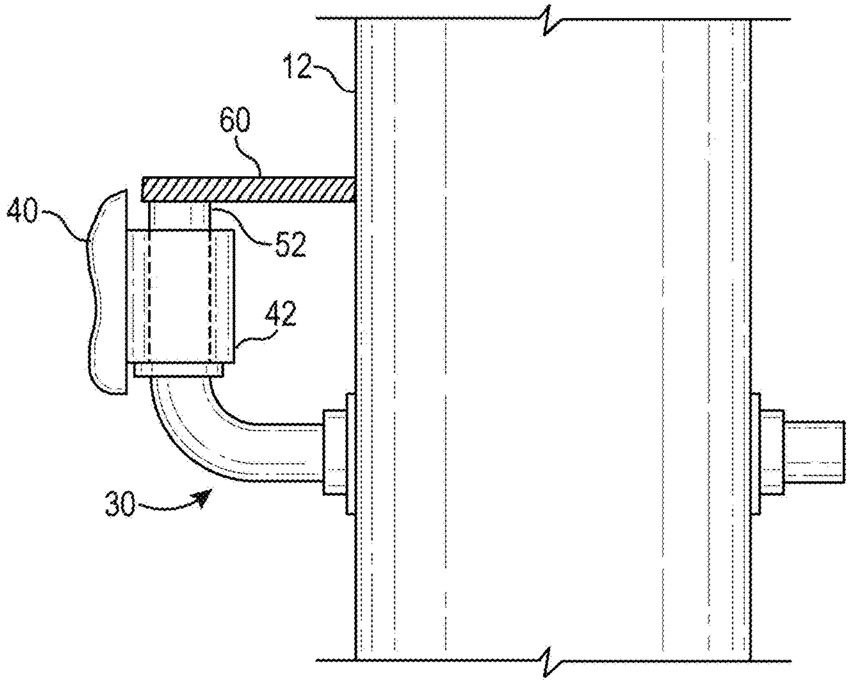
FIG. 9 is a side view of an embodiment of a gate installed on a gate hinge bolt with an anti-rotation bracket installed between the gate hinge bolt and the post.

Referring to FIG. 6 and FIG. 8, mounting boss 31 is spaced laterally from post 12 by a boss distance 50. Bracket 60 includes a bracket length 62 that is equal to or greater than boss distance 50. Referring to FIG. 9, in some embodiments, bracket length 62 is greater than boss distance 50 such that bracket 60 extends over a portion of or beyond exposed portion 52. For example, as shown in FIG. 9, bracket 60 may be positioned adjacent the end of exposed portion 52 to prevent rotation of gate hinge bolt 30 relative to post 12. In such embodiments, bracket 60 may be secured to the end of exposed portion 52 using a fastening means such as a screw, adhesive or weld.

Figure 10:
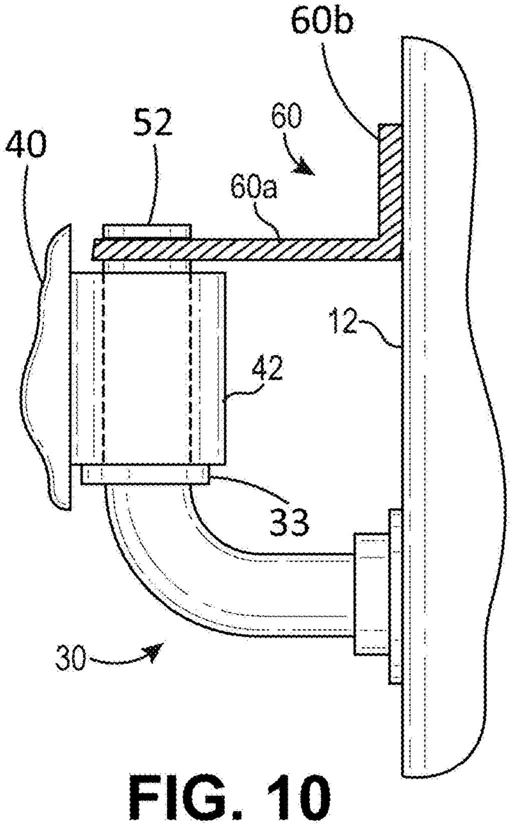
FIG. 10 is a side view of an embodiment of a gate installed on a gate hinge bolt with an anti-rotation bracket installed between the gate hinge bolt and the post.
Figure 11:
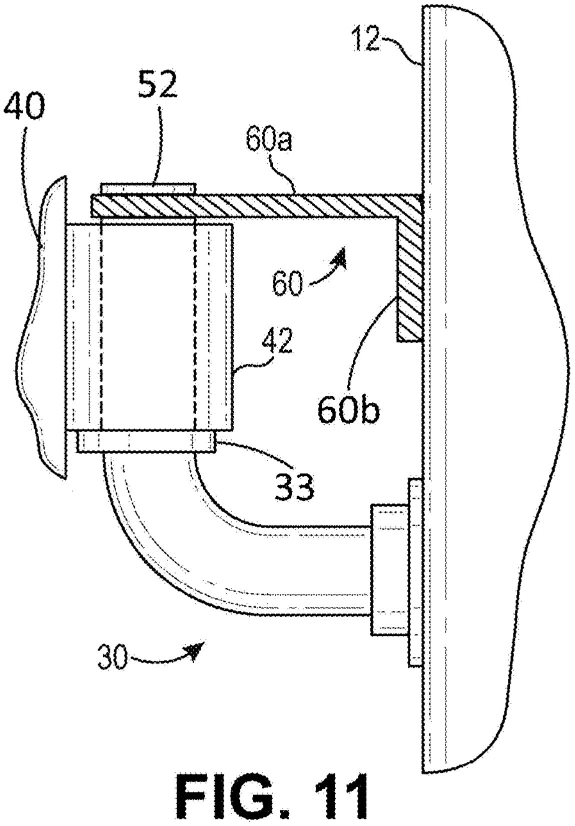
FIG. 11 is a side view of an embodiment of a gate installed on a gate hinge bolt with an anti-rotation bracket installed between the gate hinge bolt and the post.
Figure 12:
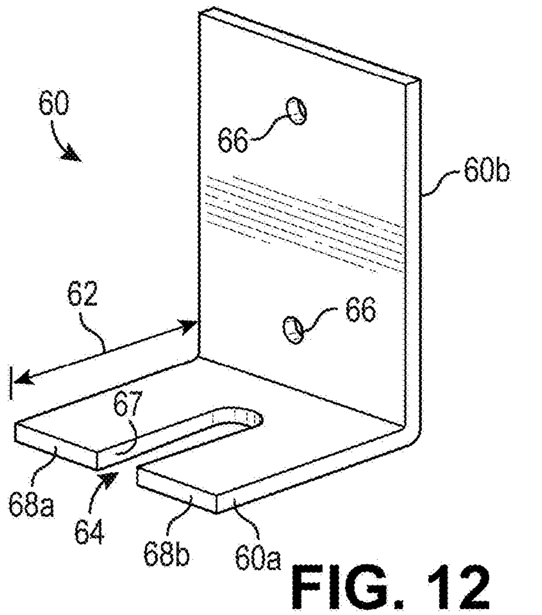
FIG. 12 is a perspective view of an embodiment of an anti-rotation bracket configured for attachment to a post to prevent gate hinge bolt rotation.
Figure 13:
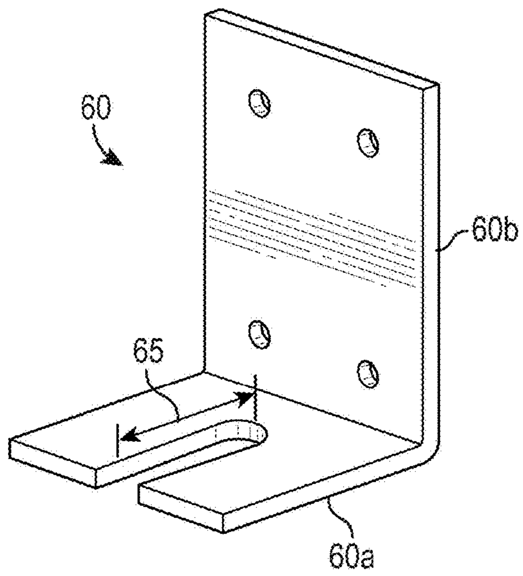
FIG. 13 is a perspective view of an embodiment of an anti-rotation bracket configured for attachment to a post to prevent gate hinge bolt rotation.
Figure 14:
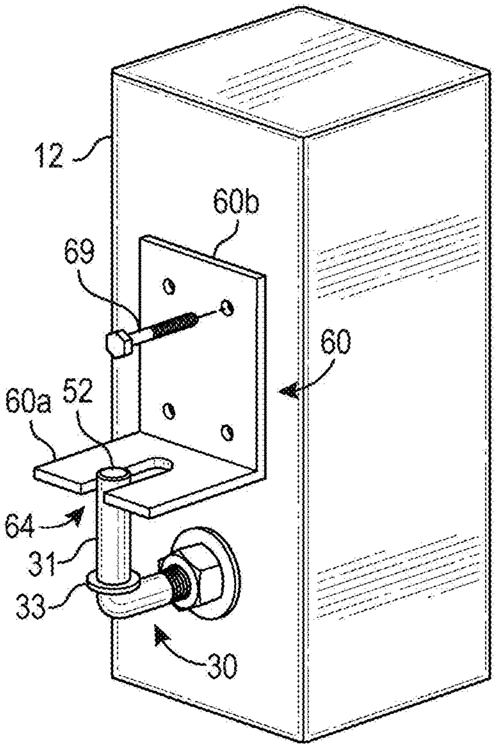
FIG. 14 is a perspective view of an embodiment of a gate hinge bolt disposed on a post including an anti-rotation bracket extending between the post and the gate hinge bolt.

In further embodiments, as shown in FIG. 10 and FIG. 11, bracket 60 includes an L-shaped bracket including a first bracket portion **60*a* extending from post 12 to exposed portion 52, and a second bracket portion 60*b* extending from first bracket portion 60*a*. In such configurations, first bracket portion 60*a* engages mounting boss 31, and second bracket portion 60*b* engages post 12. Bracket 60 may be oriented such that second bracket portion 60*b* extends above first bracket portion 60*a* as shown in FIG. 10, or conversely such that second bracket portion 60*b* extends below first bracket portion 60*a* as shown in FIG. 11**.

Referring to FIGS. 12-15, anti-rotation bracket 60 includes a forked bracket which, when mounted to a fence post or wall using fasteners, serves to capture the pintle portion or mounting boss 31 of gate hinge bolt 30 and thus prevent it from rotating under torsional load. Bracket 60 includes first and second mounting holes 66 on second bracket portion **60*b*. Mounting holes 66 are positioned to allow bracket 60 to be secured to post 12 using fasteners 69 such as nails, screws or lag bolts. Additionally, first bracket portion 60*a* includes a recess or slot 64 shaped to receive a portion of mounting boss 31 in the slot when bracket 60 and gate hinge bolt 30 are both installed on post 12. Slot may include any suitable recess to engage a portion of the mounting boss 31, such as but not limited to a U-shaped slot or a recessed portion. Specifically, the exposed portion 52 of mounting boss 31 is received in slot 64. As such, gate hinge bolt 30 is prevented from rotating relative to post 12 because angular travel of mounting boss 31 is limited by mechanical engagement with bracket 60 in slot 64**.

Slot 64 includes a slot length 65 greater than the diameter of mounting boss 31 in some embodiments. Slot length 65 provides a range of positions where mounting boss 31 may be positioned along the slot 64. This feature provides advantages because the mounting boss distance 50, shown in FIG. 6, may vary slightly depending on how far gate hinge bolt 30 is installed into post 12. By providing slot 64 having a slot length 65, bracket 60 provides a universal solution for securing various gate hinge bolts having different mounting boss distances 50. Thus, bracket 60 is configured to fit various embodiments of gate hinge bolts mounted with varying mounting boss distances 50. In some embodiments, four fasteners **69*a*, 69*b*, 69*c*, 69*d* are used to secure bracket 60 to post 12 such that bracket 60 is rigidly secured to post 12 and cannot move when a gate is opened or closed, thereby securing mounting boss 31 in an upright orientation with an anti-rotation feature. As shown in FIGS. 12-15, bracket 60 and gate hinge bolt 60 are secured to a square or rectangular post 12** or a flat wall, but the present invention may also be adapted for use with posts having other shapes, such as oval or round.

Figure 15:
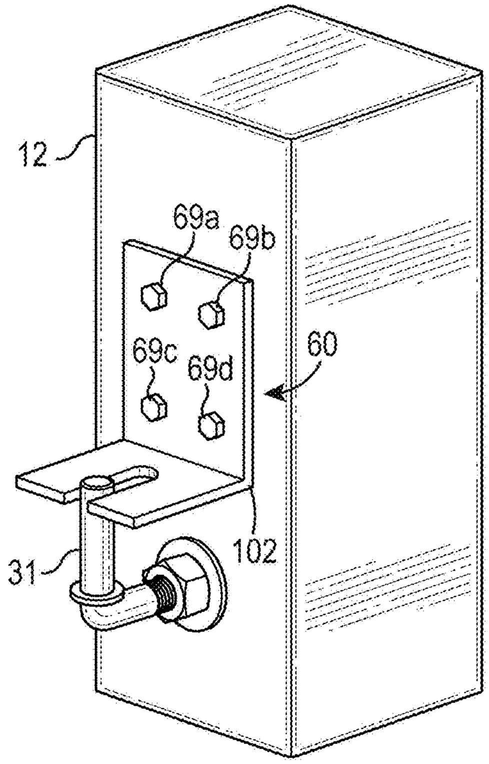
FIG. 15 is a perspective view of an embodiment of a gate hinge bolt disposed on a post including an anti-rotation bracket extending between the post and the gate hinge bolt.
Figure 38:
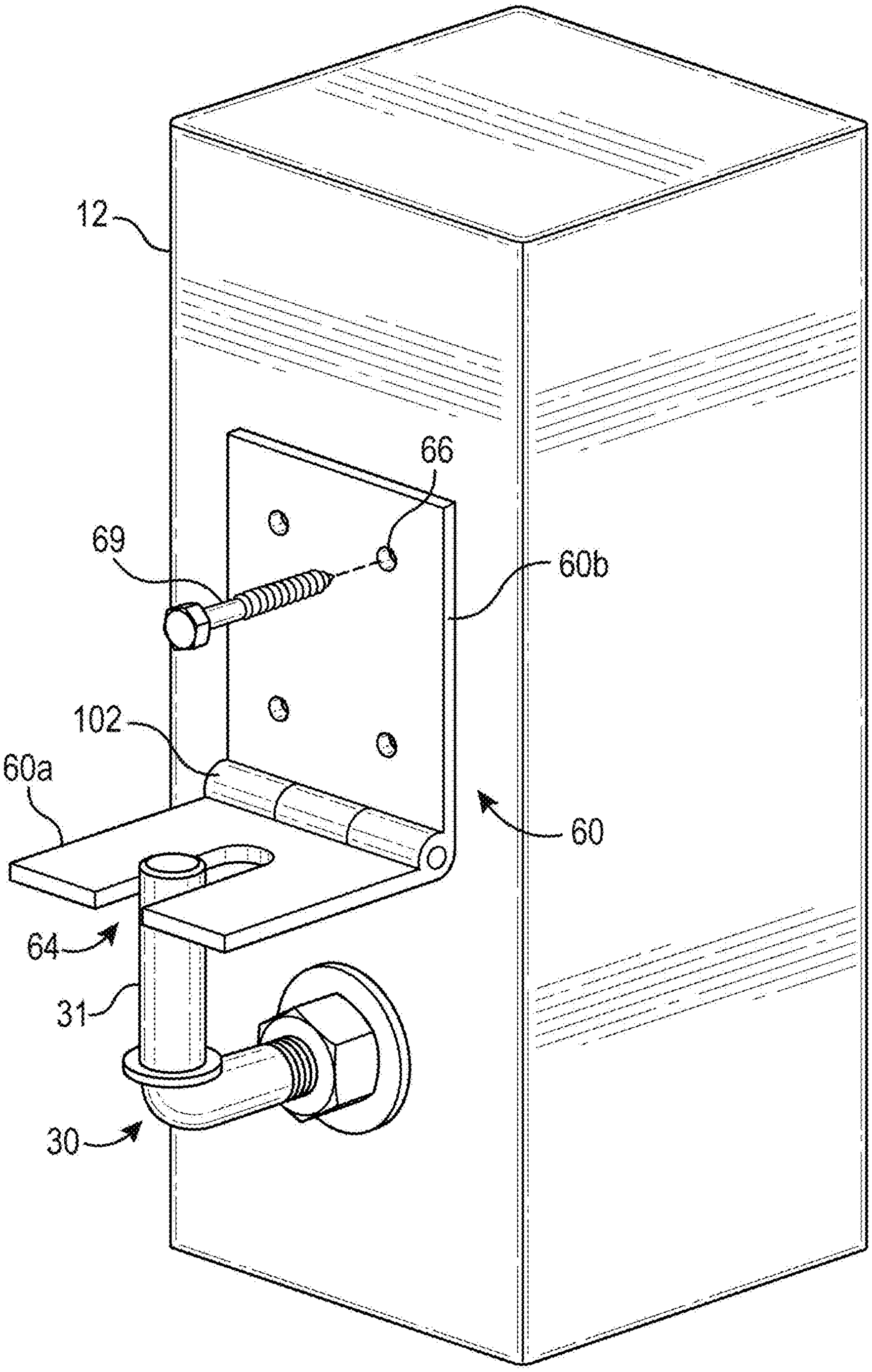
FIG. 38 a perspective view of an embodiment of a gate hinge bolt with an anti-rotation bracket installed on a post in accordance with the present disclosure.

As shown in FIG. 15 and FIG. 38, in some embodiments, bracket 60 may include a hinge 102 between first bracket portion **60*a* and second bracket portion 60*b* allowing first bracket portion 60*a* to be selectively pivoted or folded toward second bracket portion 60*b* away from mounting boss 31 to allow a user to remove the gate. When the gate is installed, first bracket portion 60*a* is lowered into position engaging exposed portion 52 of mounting boss 31 to prevent rotation of the gate hinge bolt. In other embodiments, bracket 60** is fixed.

Figure 16:
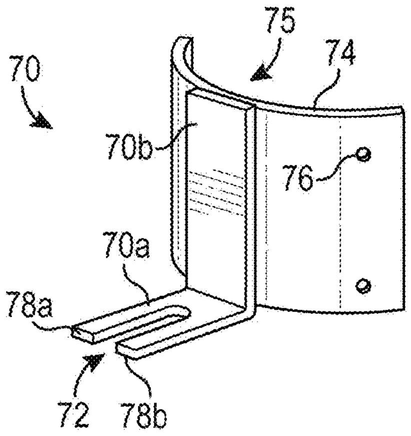
FIG. 16 is a perspective view of an embodiment of an anti-rotation bracket configured for attachment to a post to prevent gate hinge bolt rotation.
Figure 17:
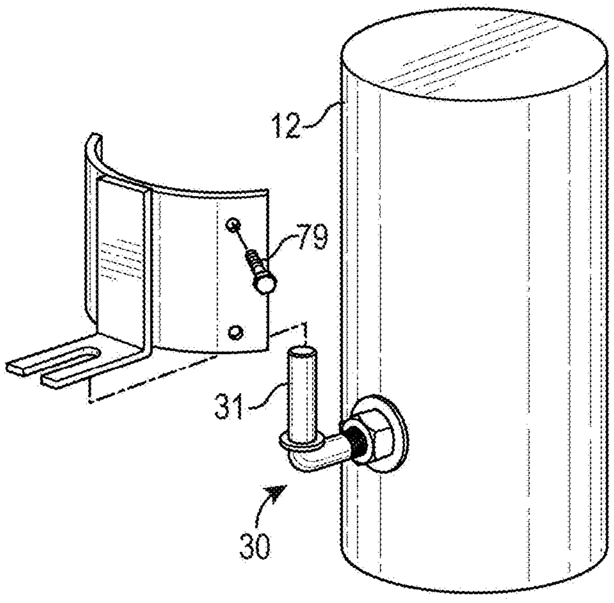
FIG. 17 is a perspective view of an embodiment of an anti-rotation bracket configured for attachment to a post to prevent gate hinge bolt rotation.
Figure 18:
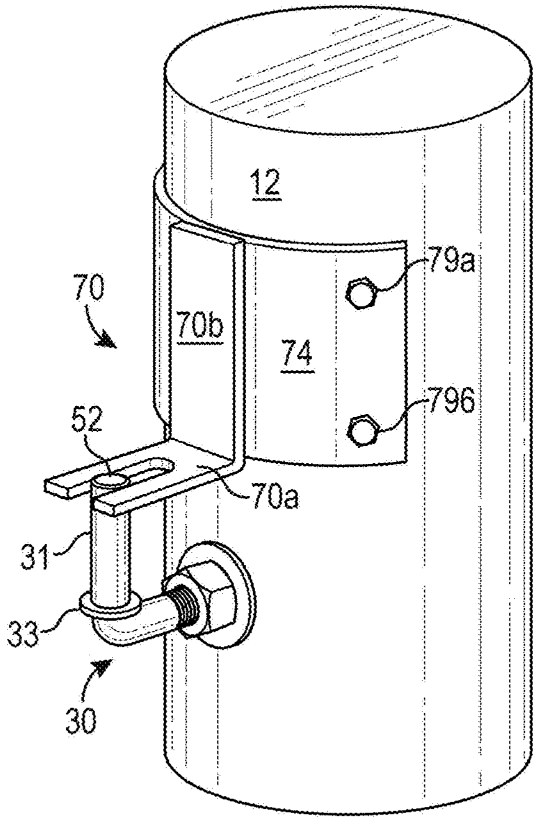
FIG. 18 is a perspective view of an embodiment of a gate hinge bolt disposed on a post including an anti-rotation bracket extending between the post and the gate hinge bolt.

Referring to FIGS. 16-18, an alternative embodiment of bracket 70 includes a bracket configured for attachment to curved surface such as a round post. As shown in FIG. 16, bracket 70 includes a first bracket portion **70*a* configured to extend toward the mounting boss 31, and a second bracket portion 70*b* oriented perpendicular to first bracket portion 70*a*. Second bracket portion 70*b* may be secured directly to a post 12. In some embodiments, second bracket portion 70*b* includes a curved base 74 with a concave backside 75 shaped to fit the curvature of a round post 12. One or more mounting holes 76 are disposed on the curved base 74 positioned to receive one or more fasteners 79 to secure bracket 70 to post 12. For example, as shown in FIG. 18, a first fastener 79*a* and a second fastener 79*b* secure bracket 70 to post 12**.

Bracket 70 includes a slot 72 shaped to receive a portion of exposed portion 52 of mounting boss 31 between first prong **78*a* and second prong 78*b*. Thus, when bracket 70 and gate hinge bolt 30 are both installed on post 12, mounting boss 31 is angularly limited by first and second prongs 78*a*, 78*b* on first bracket portion 70*a* to prevent rotation of gate hinge bolt 30 relative to post 12**.

Figure 19:
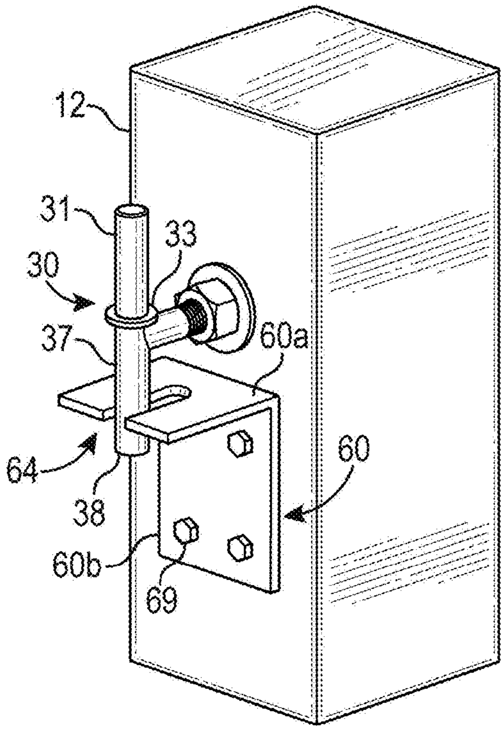
FIG. 19 is a perspective view of an embodiment of a gate hinge bolt disposed on a post including an anti-rotation bracket extending between the post and the gate hinge bolt.

Referring to FIG. 19, in some alternative embodiments, gate hinge bolt 30 includes a mounting boss 31 and an offset bracket post 37 extending opposite mounting boss 31.

Bracket 60 is mounted on the side of gate hinge bolt 30 opposite mounting boss 31 such that bracket post 37 is received in slot 64. In some embodiments the tip 38 of bracket post 37 protrudes through slot 64 in first bracket portion 60*a*, thereby preventing rotation of gate hinge bolt 30 relative to post 12. Second bracket portion 60*b* is secured to post 12 using one or more fasteners 69.

Figure 20:
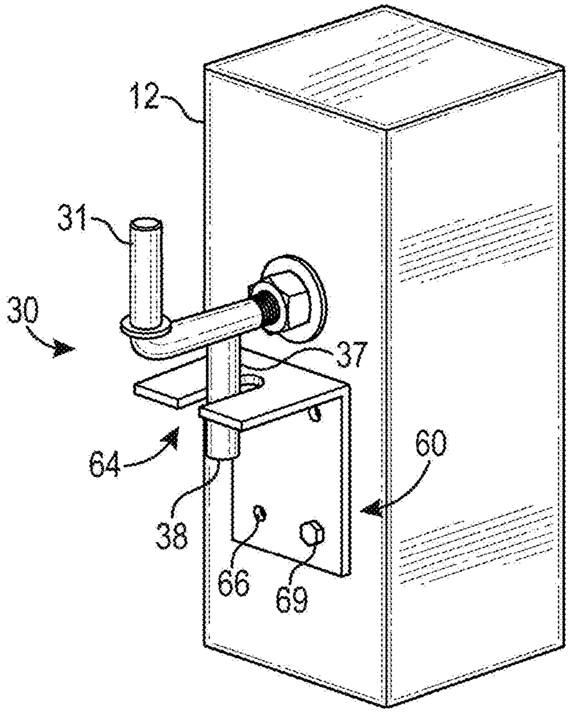
FIG. 20 is a perspective view of an embodiment of a gate hinge bolt disposed on a post including an anti-rotation bracket extending between the post and the gate hinge bolt.

Referring to FIG. 20, in further embodiments, bracket post 37 does not extend directly below mounting boss 31, but rather along the length of gate hinge bolt between mounting boss 31 and post 12. In such embodiments, bracket post 37 is received in slot 64, and tip 38 of bracket post 37 protrudes through slot 64 providing an anti-rotation feature when gate hinge bolt 30 and bracket 60 are both secured to post 12.

Figure 21:
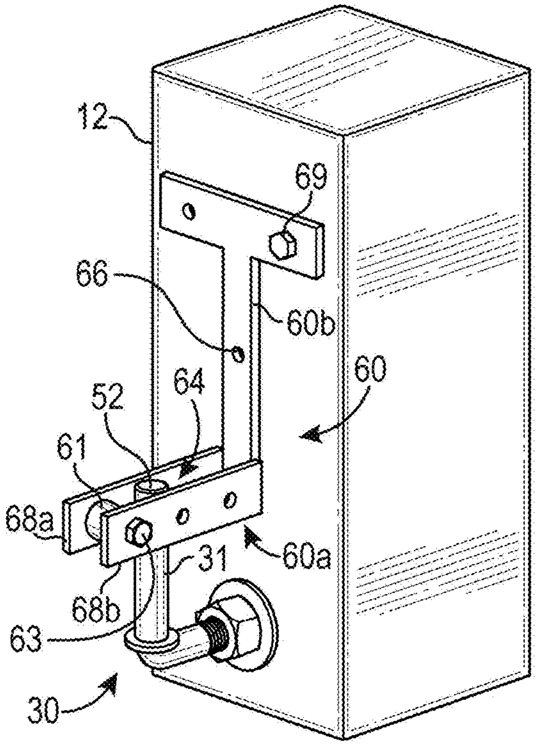
FIG. 21 is a perspective view of an embodiment of a gate hinge bolt disposed on a post including an anti-rotation bracket extending between the post and the gate hinge bolt.
Figure 22:
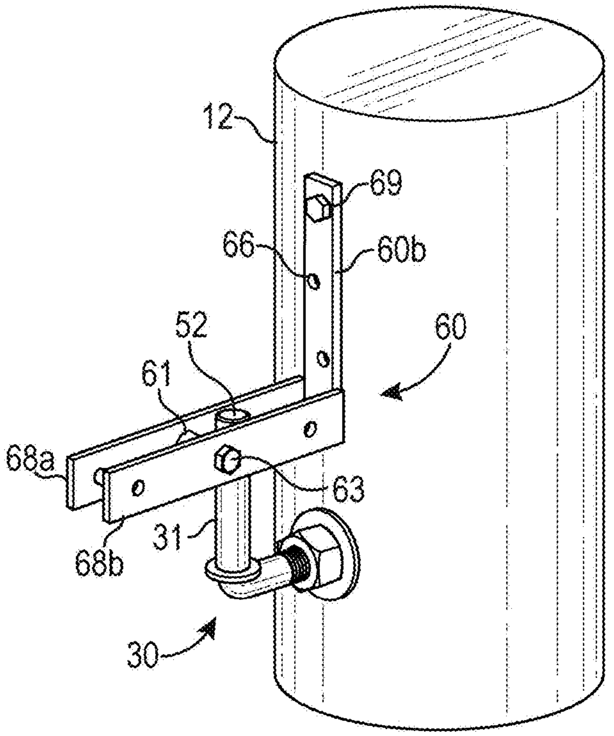
FIG. 22 is a perspective view of an embodiment of a gate hinge bolt disposed on a post including an anti-rotation bracket extending between the post and the gate hinge bolt.

Referring to FIG. 21 and FIG. 22, in alternative embodiments, bracket 60 includes a more complex configuration including a first bracket portion 60*a* protruding away from post 12, and a second bracket portion 60*b* configured for attachment to post 12. First bracket portion 60*a* includes a first prong 68*a* and a second prong 68*b* each forming a flange extending from second bracket portion 60*a*. A slot 64 is defined between first and second prongs 68*a*, 68*b*. A bushing 61 is disposed between first and second prongs 68*a*, 68*b*, and a fastener extends through bushing 61 between first and second prongs 68*a*, 68*b*. Mounting boss 31 is received in slot 64 between bushing 61 and post 12, thereby preventing rotation of gate hinge bolt 30 relative to post 12. In some embodiments, multiple bushing mount holes are provided along the length of first bracket portion 60 to provide different locations to mount bushing 61. In some embodiments, first prong 68*a*, second prong 68*b* and second bracket portion 60*b* are formed from a stamped flat plate, and first and second prongs 68*a*, 68*b* are formed by bending each prong relative to second base portion 60*b*.

Figure 23:
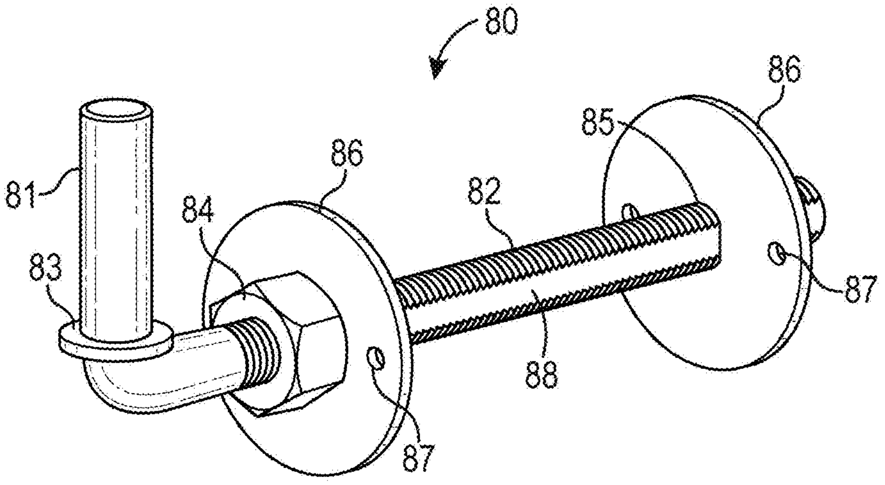
FIG. 23 is a perspective view of an embodiment of a gate hinge bolt with an anti-rotation configuration in accordance with the present disclosure.
Figure 24:
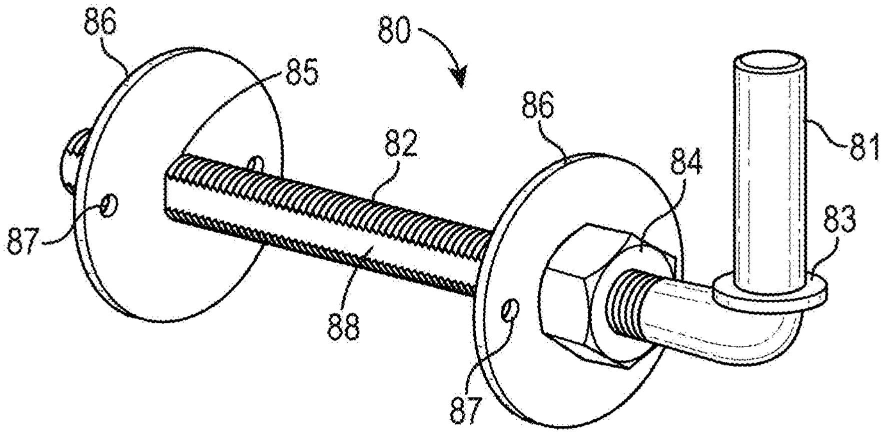
FIG. 24 is a perspective view of an embodiment of a gate hinge bolt with an anti-rotation configuration in accordance with the present disclosure.
Figure 25:
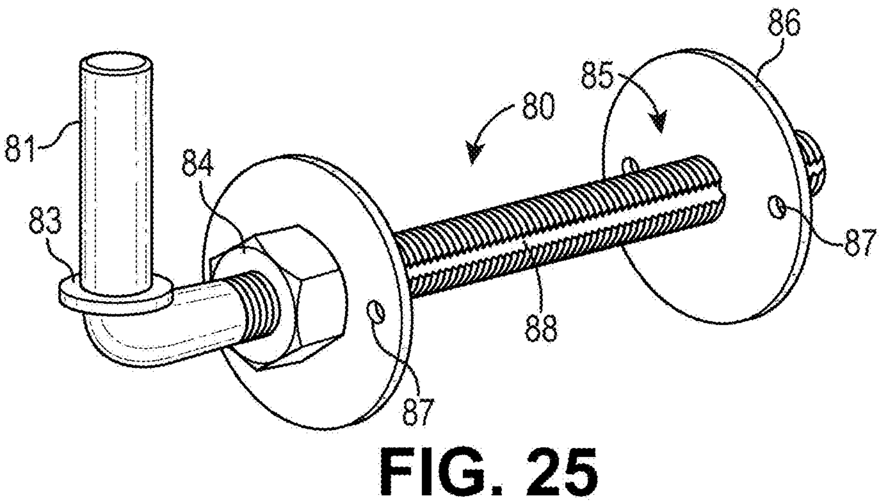
FIG. 25 is a perspective view of an embodiment of a gate hinge bolt with an anti-rotation configuration for installation on a post in accordance with the present disclosure.
Figure 26:
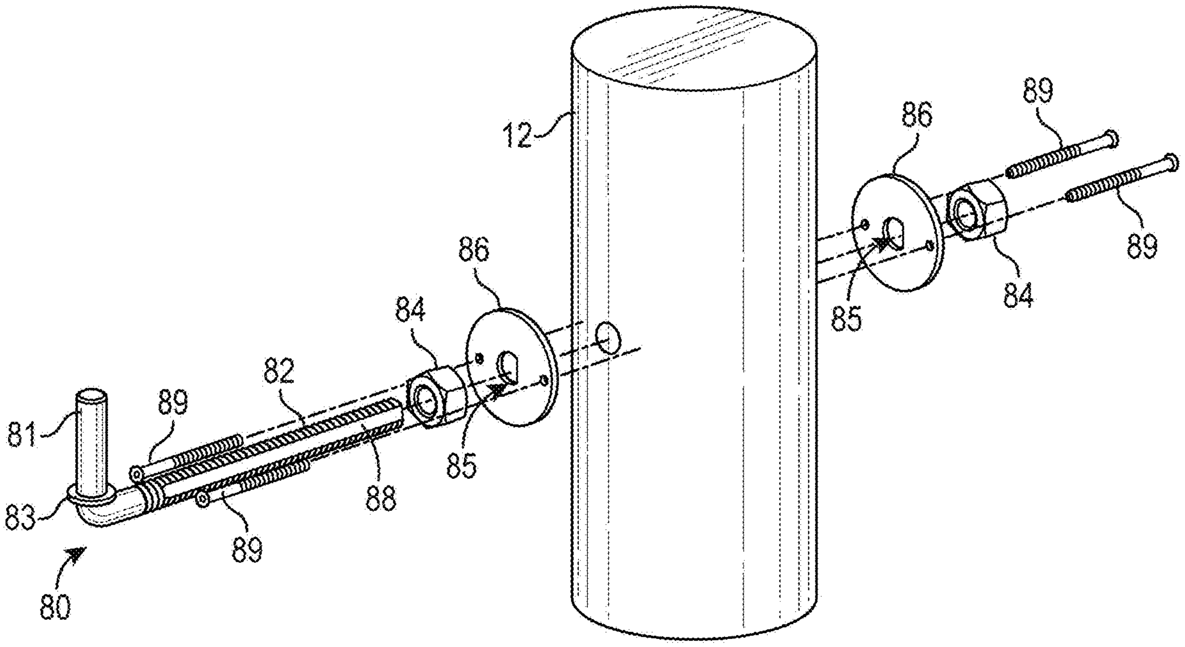
FIG. 26 is an exploded perspective view of an embodiment of a gate hinge bolt with an anti-rotation configuration in accordance with the present disclosure.
Figure 27:
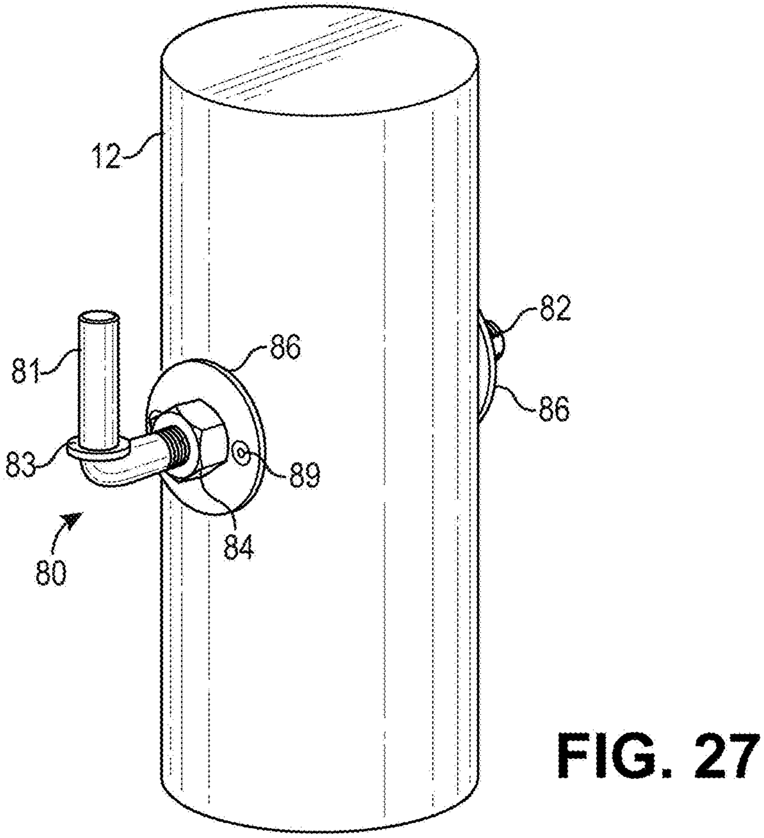
FIG. 27 is a perspective view of an embodiment of a gate hinge bolt with an anti-rotation configuration installed on a post in accordance with the present disclosure.

Referring to FIGS. 23-27, an alternative embodiment of a gate hinge bolt 80 includes a threaded shaft 82 configured for insertion into a post or wall. A fastener 84 such as a nut is disposed on threaded shaft 82 to tighten gate hinge bolt 80 relative to post 12. A keyed washer 86 is disposed between fastener 84 and the post. A securing hole 87 is defined in keyed washer 86 to receive a screw or nail to prevent keyed washer 86 from rotating relative to the post or wall. A keyhole 85 is defined in keyed washer 86, and threaded shaft 82 includes a keyed surface 88 complimentary to the shape of keyhole 85. When gate hinge bolt 80 is tightened against a post or wall and keyed washer 86 is secured to the post or wall via a fastener 89 through each securing hole 87, gate hinge bolt 80 is prevented from rotating relative to the post or wall via the keyed engagement between keyed washer 86 and keyed surface 88 on threaded shaft 82. Keyed surface 88 may take any suitable form, such as a flat chamfer along the length of threaded shaft 82 on only one side as shown in FIG. 23, a flat chamfer along the length of threaded shaft 82 on both sides of the shaft as shown in FIG. 24, or one or more blind recessed slots as shown in FIG. 25.

Figure 28:
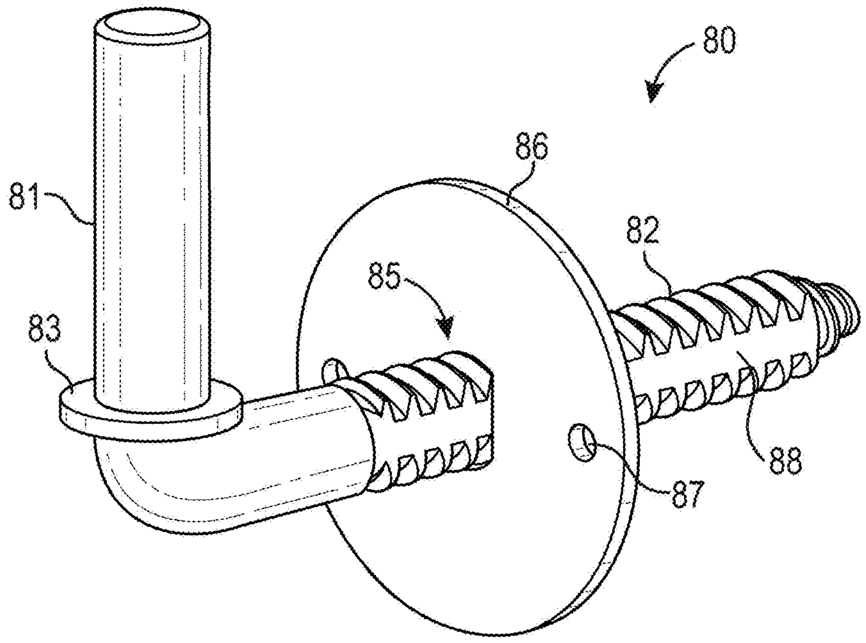
FIG. 28 is a perspective view of an embodiment of a gate hinge bolt with an anti-rotation configuration in accordance with the present disclosure.
Figure 29:
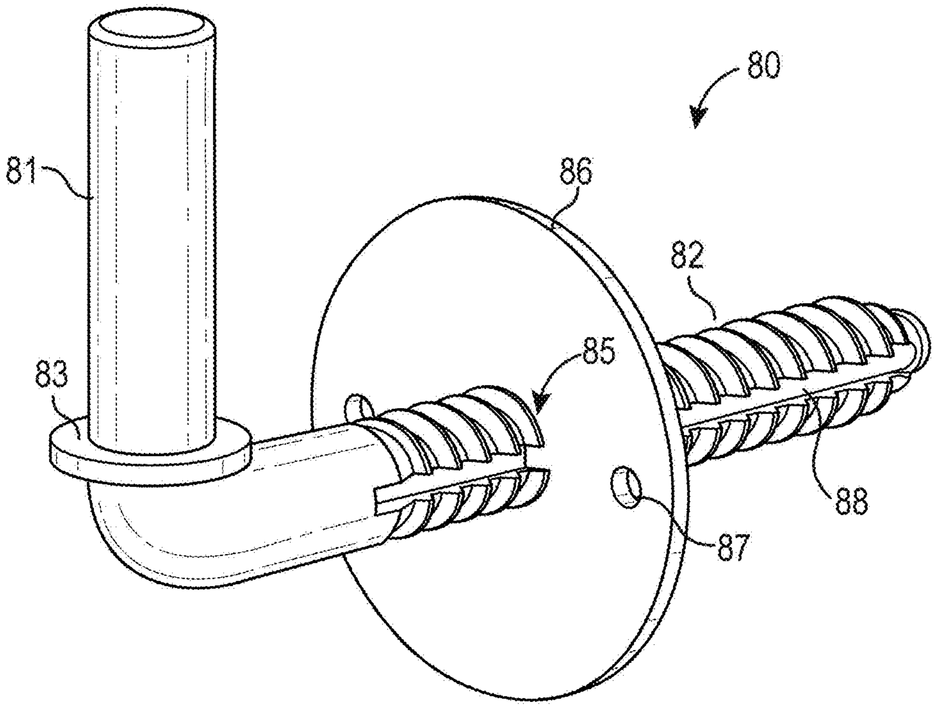
FIG. 29 is a perspective view of an embodiment of a gate hinge bolt with an anti-rotation configuration in accordance with the present disclosure.
Figure 30:
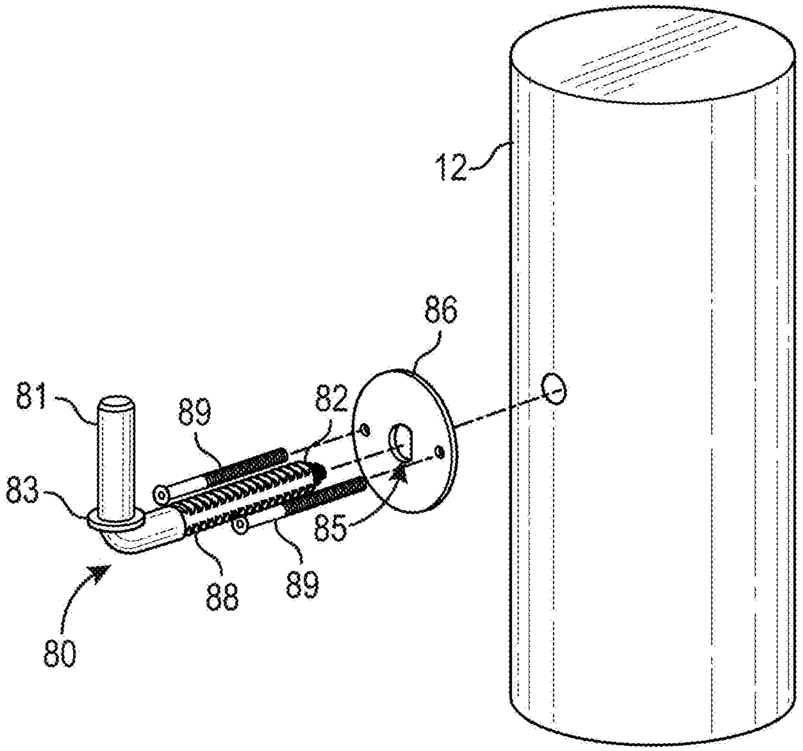
FIG. 30 is an exploded perspective view of an embodiment of a gate hinge bolt with an anti-rotation configuration in accordance with the present disclosure.
Figure 31:
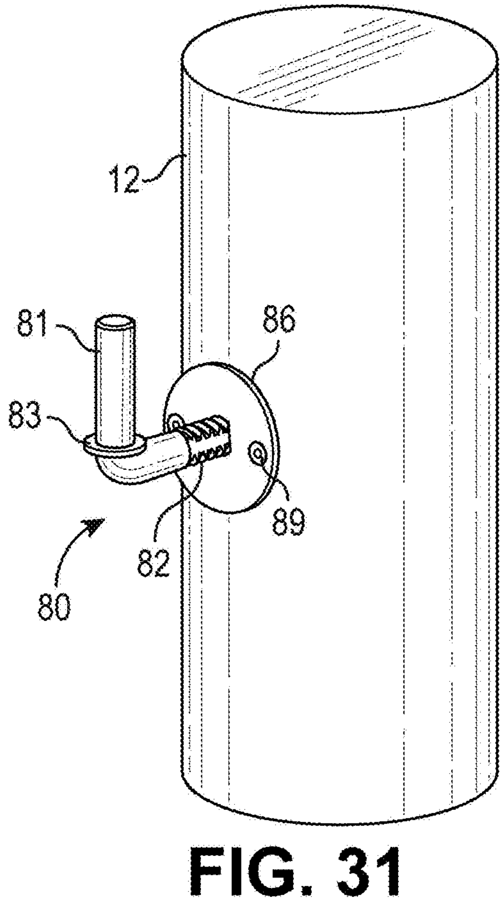
FIG. 31 is a perspective view of an embodiment of a gate hinge bolt with an anti-rotation configuration installed on a post in accordance with the present disclosure.

Referring to FIGS. 28-31, an alternative embodiment of a gate hinge bolt 80 includes a threaded shaft 82 forming a lag bolt to be screwed directly into a mounting structure such as a post or wall. A keyed washer 86 is disposed along the threaded shaft. A securing hole 87 is defined in keyed washer 86 to receive a screw or nail to prevent keyed washer 86 from rotating relative to the post or wall. A keyhole 85 is defined in keyed washer 86, and threaded shaft 82 includes a keyed surface 88 complimentary to the shape of keyhole 85. When gate hinge bolt 80 is screwed into a post or wall and keyed washer 86 is secured to the post or wall via a fastener 89 through each securing hole 87, gate hinge bolt 80 is prevented from rotating relative to the post or wall via the keyed engagement between keyed washer 86 and keyed surface 88 on threaded shaft 82. Keyed surface 88 may take any suitable form, such as a flat chamfer along the length of threaded shaft 82 on only one side as shown in FIG. 28, a flat chamfer along the length of threaded shaft 82 on both sides of the shaft, or one or more blind recessed slots as shown in FIG. 29.

Figure 32:
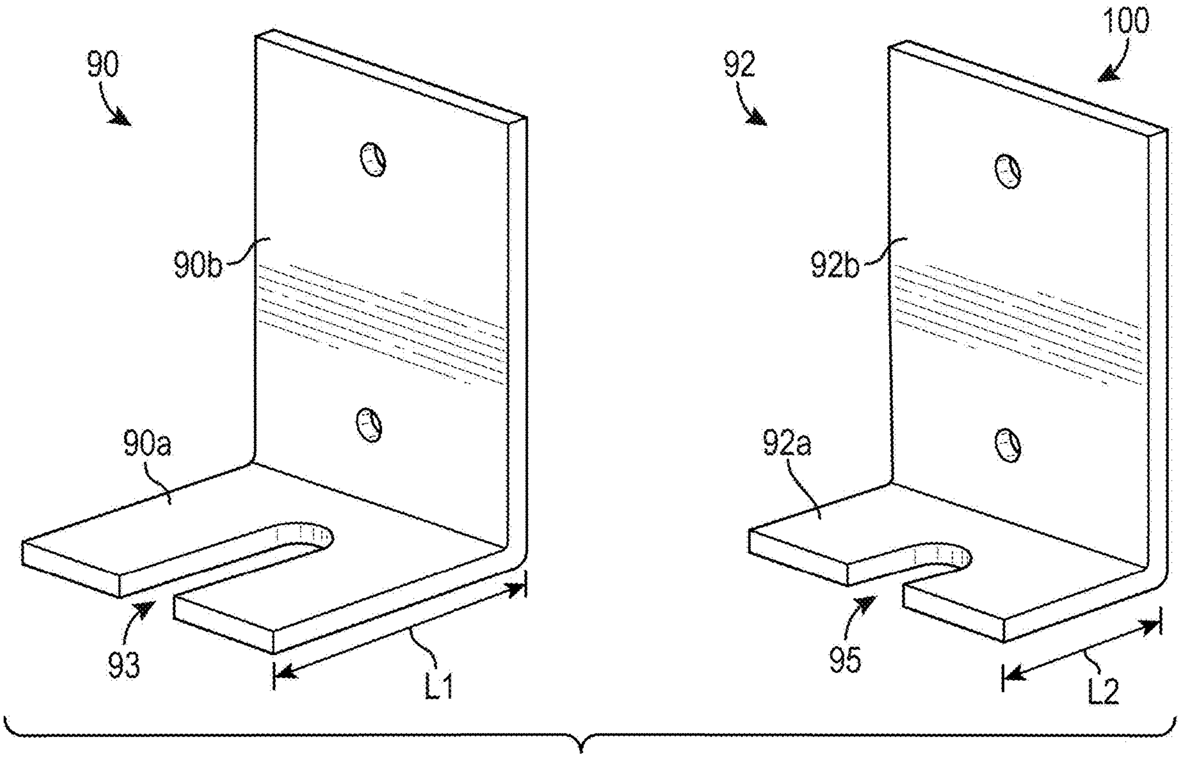
FIG. 32 is a perspective view of an embodiment of a kit including first and second anti-rotation brackets for use with a gate hinge bolt in accordance with the present disclosure.

Referring to FIG. 32, in some embodiments, a bracket kit 100 includes a first bracket 90 and a second bracket 92. Bracket kit includes multiple brackets 90, 92 each including a different length such that the proper length bracket may be selected from the kit to fit a particular mounting boss configuration. First bracket 90 includes a first bracket portion 90*a* and a second bracket portion 90*b*. First bracket 90 includes a slot 93 shaped to receive a portion of a mounting boss on a gate hinge bolt. First bracket portion 90*a* includes a first length L1. Second bracket 92 includes a first bracket portion 92*a* and a second bracket portion 92*b*. Second bracket 90 includes a slot 95 shaped to receive a portion of a mounting boss on a gate hinge bolt. Second bracket portion 92*a* includes a second length L2 less than first length L1.

Figure 33:
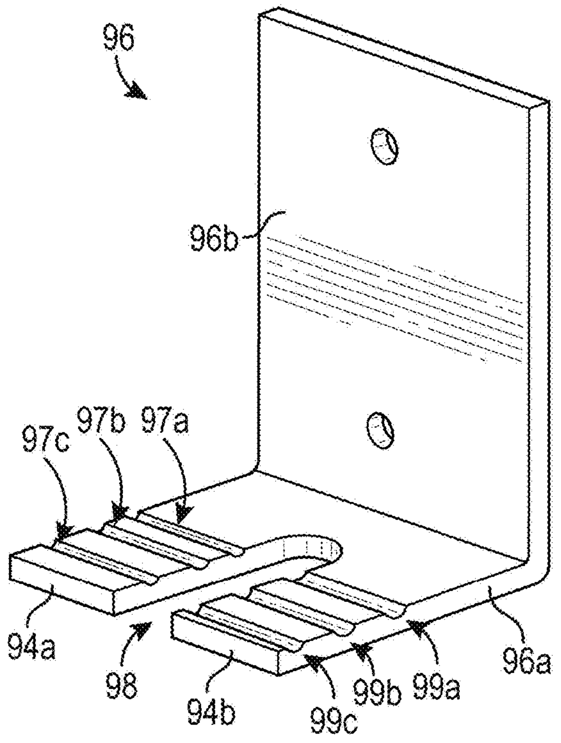
FIG. 33 is a perspective view of an embodiment of an anti-rotation bracket for use with a gate hinge bolt having pre-defined fracture lines in accordance with the present disclosure.

Referring to FIG. 33, in alternative embodiments, bracket 96 includes an L-shaped body including a first portion 96*a* and a second portion 96*b* oriented perpendicular to first portion 96*a*. First portion 96*a* includes a slot 98 shaped to receive a portion of a mounting boss on a gate hinge bolt. First portion 96*a* includes a first prong 94*a* and a second prong 94*b* on each side of slot 98. A plurality of fracture lines 99 are defined on first portion 96*a* across both first and second prongs 94*a*, 94*b*. For example, first fracture line 99*a* traverses first and second prongs 94*a*, 94*b* across slot 98. First fracture line 99*a* provides a pre-defined location to break first portion 96*a* to adjust length of first portion 96*a* such that first portion 96*a* does not interfere with the body of a gate. If first portion 96*a* is too long, the bracket may undesirably contact the gate when the gate is opened or closed. By breaking first portion 96*a* along first fracture line 99*a*, first portion 96*a* may be shortened to prevent contact with the gate. Similarly, second fracture line 99*b* is defined on first portion 96*a* between first fracture line 99*a* and second portion 96*b*. A third fracture line 99*c* may be defined on first portion 96*a* between second fracture line 99*b* and second portion 96*b*. By providing multiple fracture lines, bracket 96 includes frangible tabs on first and second portion 94*a*, 94*b* that may be selectively broken off to customize bracket 96 during installation.

Figure 34:
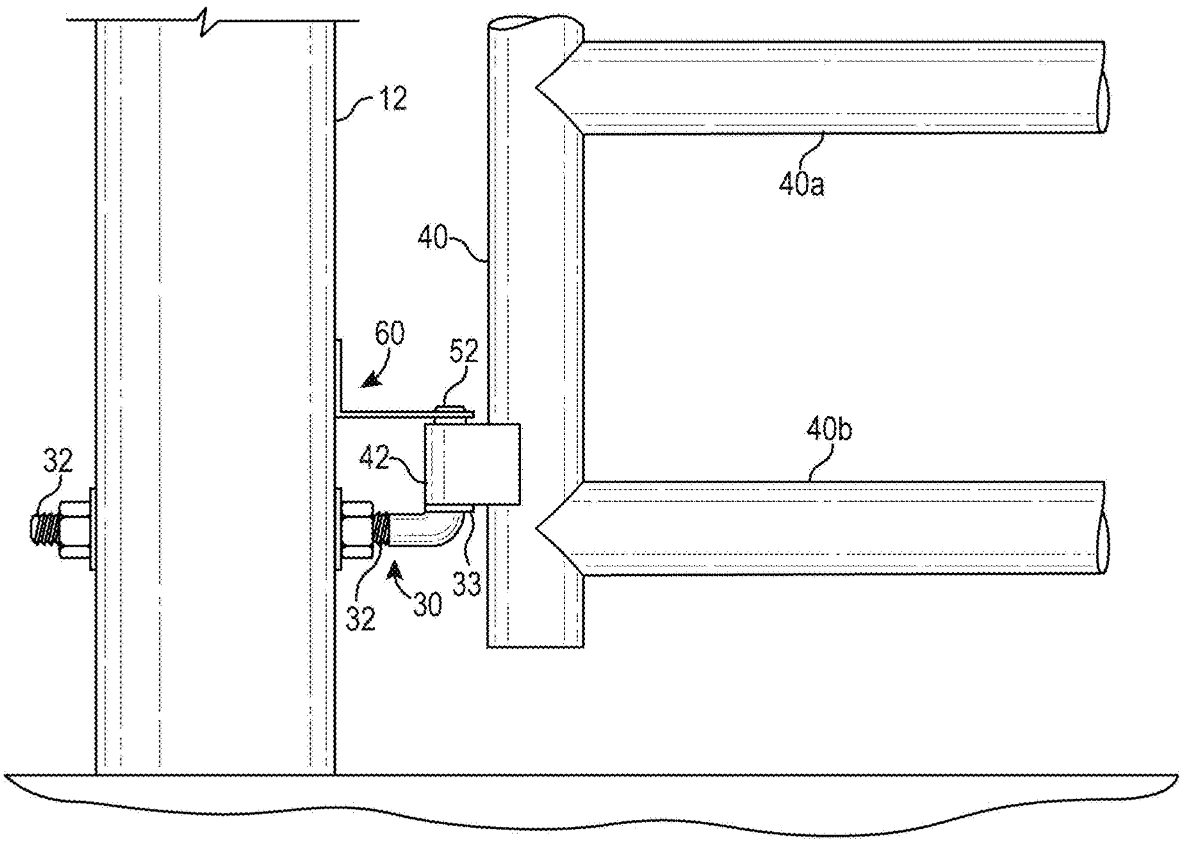
FIG. 34 is an elevation view of an embodiment of a gate mounted on a post using a gate hinge bolt with an anti-rotation bracket disposed between the post and the gate hinge bolt in accordance with the present disclosure.
Figure 35:
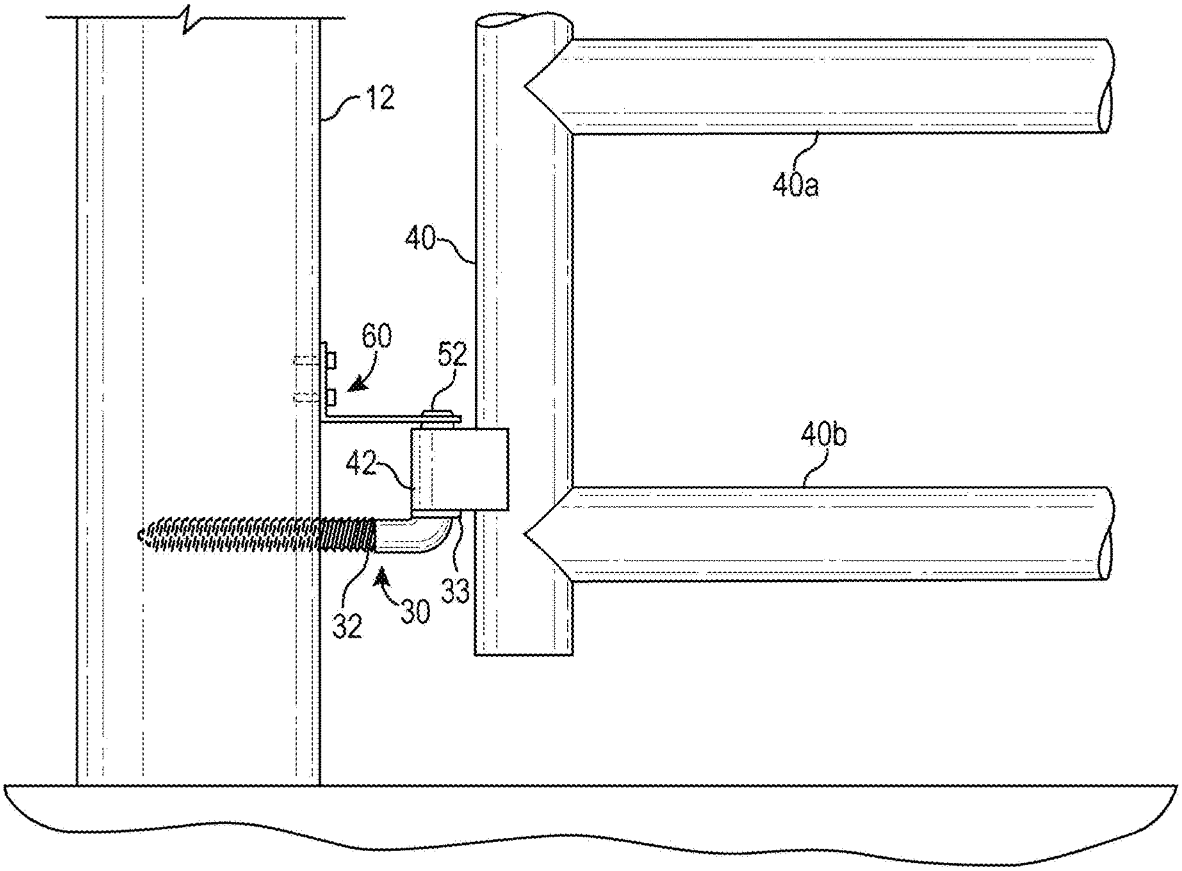
FIG. 35 is an elevation view of an embodiment of a gate mounted on a post using a gate hinge bolt with an anti-rotation bracket disposed between the post and the gate hinge bolt in accordance with the present disclosure.

Referring to FIG. 34 and FIG. 35, a gate apparatus is disclosed. Gate apparatus includes a gate with an upright bar 40, a first horizontal bar 40*a* and a second horizontal bar 40*b*. A gate hinge barrel 42 extends from upright bar 40 toward a post 12. A gate hinge bolt 30 includes a threaded shaft 32 that is secured to post 12. A mounting boss extends generally perpendicularly from the shaft in a direction generally parallel to post 12 and upright bar 40. The gate hinge barrel 42 is positioned on the mounting boss such that an exposed portion 52 of the mounting boss protrudes above the gate hinge barrel 42. An anti-rotation bracket 60 is positioned between the post 12 and the exposed portion 52 of the mounting boss. Bracket 60 engages the exposed portion 52 of the mounting boss, thereby preventing rotation of the gate hinge bolt 30 relative to post 12 when the gate is opened or closed. Gate hinge bolt 30 may take the form of a threaded machine bolt including first and second nuts and washers, as shown in FIG. 34, or alternatively, gate hinge bolt 30 may take the form of a threaded lag bolt as shown in FIG. 35.

In some alternative embodiments, a reverse configuration provides gate hinge bolt 30 attached to a gate 40, and gate hinge barrel 42 is attached to post 12. In such embodiments, bracket 60 may be secured to post 12 and engage the exposed portion 52 of the mounting boss to prevent rotation of the gate hinge bolt or gate hinge barrel.

Figure 36:
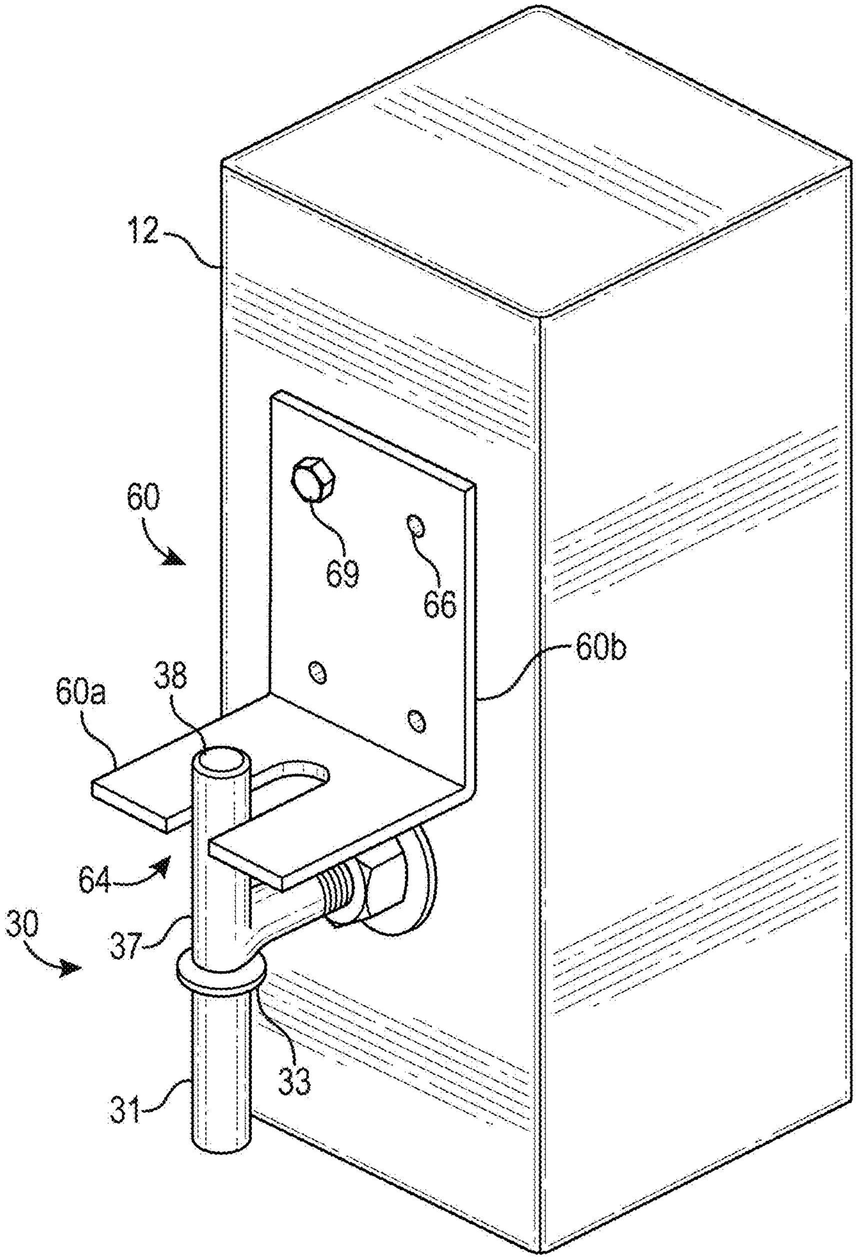
FIG. 36 is a perspective view of an embodiment of a gate hinge bolt with an anti-rotation bracket installed on a post in accordance with the present disclosure.
Figure 37:
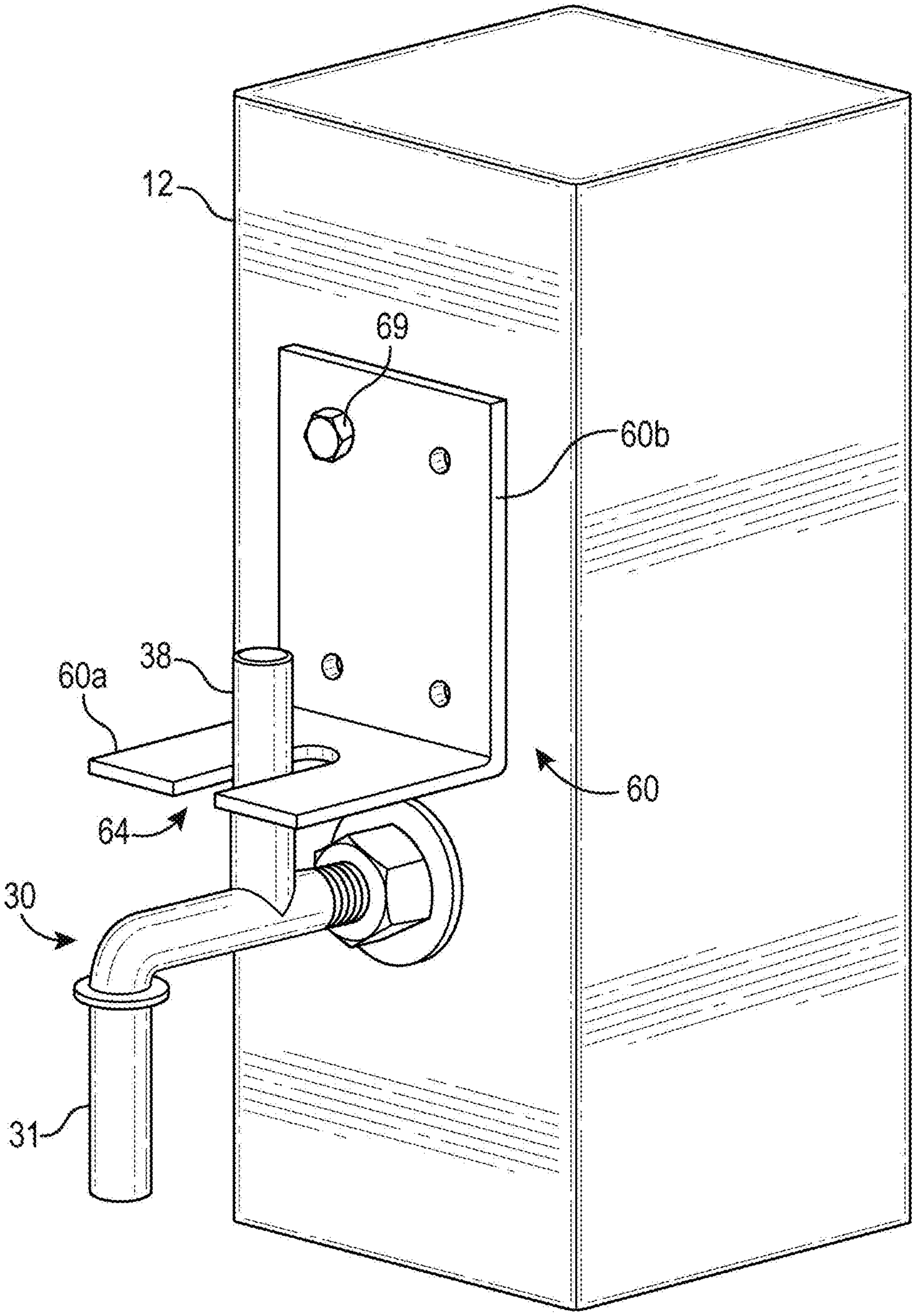
FIG. 37 is a perspective view of an embodiment of a gate hinge bolt with an anti-rotation bracket installed on a post in accordance with the present disclosure.

Referring to FIG. 36, in some applications, gate hinge bolt 30 is mounted with mounting boss 31 oriented down. For example, this could be done on an upper gate mount such that the mounting boss 31 of the upper mount is oriented down, and the mounting boss of the lower gate mount is oriented up so the gate cannot be lifted off the upper and lower mounts for security purposes. Such a configuration could be implemented with any of the gate hinge bolts and anti-rotation brackets disclosed herein. As shown in FIG. 36 and FIG. 37, anti-rotation bracket 60 is mounted above gate hinge bolt 30 such that bracket post 37 includes tip 38 extending through slot 64 in bracket 60 to prevent rotation of gate hinge bolt 30.

Thus, although there have been described particular embodiments of the present invention, it is not intended that such references to particular embodiments be construed as limitations upon the scope of this invention except as set forth in the following claims.

What is claimed is:

1. A gate apparatus, comprising:

a structure;

a gate hinge bolt disposed on the structure, the gate hinge bolt including a threaded shaft inserted into the structure and a mounting boss extending perpendicularly from the threaded shaft in an upward direction, wherein the mounting boss is spaced away from the structure by a mounting boss distance;

a gate having a gate hinge barrel positioned on the mounting boss, wherein an exposed portion of the mounting boss protrudes upwardly from the gate hinge barrel when the gate hinge barrel is disposed on the mounting boss; and an anti-rotation bracket disposed above the gate hinge bolt, above the gate hinge barrel, and between the structure and the exposed portion of the mounting boss, the anti-rotation bracket including a slot, wherein the exposed portion of the mounting boss is received in the slot, such that the anti-rotation bracket engages the mounting boss above the gate hinge barrel and prevents rotation of the gate hinge bolt, wherein the gate hinge barrel is disposed below the anti-rotation bracket between the shaft and the anti-rotation bracket.

2. The apparatus of claim 1, further comprising:

a shoulder defined on the gate hinge bolt, wherein the gate hinge barrel is disposed between the shoulder and the exposed portion of the mounting boss protruding from the gate hinge barrel.

3. The apparatus of claim 2, wherein the bracket further comprises an L-shaped body with a first portion and a second portion, wherein the first portion extends toward the mounting boss and the second portion is secured to the structure.

4. The apparatus of claim 3, further comprising at least one fastener disposed on the second portion of the bracket securing the bracket to the structure.

5. The apparatus of claim 4, wherein the slot is defined in the first portion of the L-shaped body.

6. The apparatus of claim 5, further comprising first and second nuts disposed on the threaded shaft of the gate hinge bolt.

7. The apparatus of claim 6, further comprising first and second washers disposed on the threaded shaft of the gate hinge bolt.

8. The apparatus of claim 5, wherein the bracket includes a bracket length greater than the mounting boss distance.

9. The apparatus of claim 8, wherein the second portion of the bracket is oriented away from the gate hinge bolt.

10. The apparatus of claim 8, wherein the second portion of the bracket is oriented toward the gate hinge bolt.

11. The apparatus of claim 8, wherein the structure is a rectangular post.

12. The apparatus of claim 8, wherein the structure is a round post.

13. A gate apparatus, the apparatus comprising:

a structure;

a gate hinge bolt disposed on the structure, the gate hinge bolt including a threaded shaft inserted into the structure and a mounting boss extending perpendicularly from the threaded shaft in an upward direction;

a gate having a gate hinge barrel positioned on the mounting boss, wherein an exposed portion of the mounting boss protrudes upwardly from the gate hinge barrel when the gate hinge barrel is disposed on the mounting boss; and an anti-rotation bracket disposed above the gate hinge bolt between the structure and the exposed portion of the mounting boss, the anti-rotation bracket including:

a fixed bracket body including an L-shaped body with a first portion and a second portion oriented perpendicularly to and extending upwardly from the first portion, the first portion including a first prong and a second prong, and a recess defined in the first portion between the first and second prongs of the bracket body, the recess shaped to receive the exposed portion of the mounting boss, such that the anti-rotation bracket engages the mounting boss above the gate hinge barrel and prevents rotation of the gate hinge bolt, wherein the mounting boss is spaced away from the structure by a mounting boss distance, wherein the gate hinge barrel is disposed below the anti-rotation bracket between the shaft and the anti-rotation bracket, and wherein the second portion is fixed relative to the first portion.

14. The apparatus of claim 13, further comprising one or more fastener holes defined in the second portion of the bracket body.

15. The apparatus of claim 13, further comprising a bushing disposed in the recess between the first and second prongs.

16. The apparatus of claim 13, further comprising a plurality of fracture lines defined in the first portion of the bracket body across the first and second prongs.

17. A gate apparatus, comprising:

a structure;

a gate hinge bolt disposed on the structure, the gate hinge bolt including:

a threaded shaft inserted into the structure, a mounting boss extending upwardly from and perpendicular to the threaded shaft, and a bracket post extending downwardly and perpendicular to the threaded shaft in a direction opposite the mounting boss, the bracket post extending from the threaded shaft at a position between the mounting boss and the structure;

a gate having a gate hinge barrel positioned on the mounting boss, wherein an exposed portion of the mounting boss protrudes upwardly from the gate hinge barrel when the gate hinge barrel is disposed on the mounting boss; and an anti-rotation bracket disposed below the bracket post and between the structure and the bracket post, the anti-rotation bracket including a slot, wherein the bracket post extends into the slot, such that the anti-rotation bracket engages the bracket post and prevents rotation of the gate hinge bolt, and wherein the gate hinge barrel is disposed above the anti-rotation bracket.

18. The apparatus of claim 17, further comprising a plurality of fasteners disposed on the anti-rotation bracket to secure the anti-rotation bracket to the structure.

19. The apparatus of claim 1, further comprising a bushing disposed in the slot between first and second prongs, such that the bushing is positioned in between the gate and the mounting boss.

* * * * *